US006023837A

United States Patent [19]

Finn

[11] Patent Number: 6,023,837

[45] **Date of Patent: *Feb. 15, 2000**

[54] WINDING HEAD

[75] Inventor: David Finn, Pfronten, Germany

[73] Assignee: AmaTech GmbH & Co. KG, Pfronten, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/569,182

[22] PCT Filed: Apr. 8, 1994

[86] PCT No.: PCT/DE94/00395

§ 371 Date: Nov. 27, 1995

§ 102(e) Date: Nov. 27, 1995

[87] PCT Pub. No.: WO94/28562

PCT Pub. Date: Dec. 8, 1994

[30] Foreign Application Priority Data

May 28, 1993 [DE] Germany ............................ 43 17 897
Jul. 28, 1993 [DE] Germany ............................ 43 25 334

[51] Int. Cl.[7] .................................................... B23P 21/00

[52] U.S. Cl. ........................ 29/566.1; 29/33 F; 29/564.5; 29/605

[58] Field of Search .................................. 29/33 F, 33 L, 29/33 M, 564.5, 564.6, 564.7, 564.8, 566.1, 566.2, 605; 242/430, 434, 439

[56] References Cited

U.S. PATENT DOCUMENTS

| | | | |
|---|---|---|---|
| 4,031,612 | 6/1977 | Nicolas | 29/564.4 X |
| 4,289,281 | 9/1981 | George et al. | 29/735 X |
| 4,988,047 | 1/1991 | Kariya et al. | 29/605 X |
| 4,997,138 | 3/1991 | Luciani et al. | 29/605 X |
| 5,065,503 | 11/1991 | Luciani et al. | 29/564.5 |
| 5,090,108 | 2/1992 | Banner et al. | 29/566.1 X |
| 5,245,748 | 9/1993 | Luciani et al. | 29/564.5 X |
| 5,442,848 | 8/1995 | Koller et al. | 29/556.1 |
| 5,586,383 | 12/1996 | Dolgas et al. | 29/605 X |

FOREIGN PATENT DOCUMENTS

| | | | |
|---|---|---|---|
| 0191720 A 1 | 1/1986 | Germany . | |
| 3841966 A 1 | 12/1988 | Germany . | |
| 3932313 A 1 | 9/1989 | Germany . | |
| 4200492 A 1 | 1/1992 | Germany . | |
| PCT/DE92/ 00928 | 11/1992 | Germany . | |
| 60-226114 | 11/1985 | Japan | 29/605 |
| 62-243310 | 10/1987 | Japan | 29/605 |
| 5-68358 | 3/1993 | Japan | 29/564.5 |
| 760318 | 9/1980 | U.S.S.R. | 29/735 |
| 1427505 | 9/1983 | U.S.S.R. | 29/33 L |

OTHER PUBLICATIONS

Mikroschweiben von Feinstdrahten mit dem Lasertrahl, Von Dipl.—Ing. Johannes Maul, Urberach.

Feinwerktechnik & Messtechnik 92 (1984) 7, pp. 363–366.

International Search Report PCT DE94/00395, Aug. 11, 1994.

*Primary Examiner*—David P. Bryant
*Attorney, Agent, or Firm*—Larry L. Saret; Laff, Whitesel & Saret, Ltd.

[57] ABSTRACT

Device for producing a coil winding (33) from winding wire on a winding carrier (32) with a winding head (10) which has a wire guiding means (16) and is movable relative to the winding carrier (32) in which a wire connecting means (17) and a wire severing means (18) are provided in addition to the wire guiding means (16) as further integral parts of the winding head (10).

17 Claims, 4 Drawing Sheets

WINDING HEAD

BACKGROUND OF THE INVENTION

The present invention relates to a device for producing a coil winding from winding wire on a winding carrier with a winding head which has a wire guiding means and is movable relative to the winding carrier. The invention also relates to a method of producing an electrically conductive connection which can be carried out using this device.

Devices of the aforementioned type can be used in the production of coil arrangements in which a wire conductor is wound round the winding carrier to form a coil winding by means of a winding head and wire ends of the winding wire are connected to attachment surfaces of the winding carrier or the adjacent components. To produce the connection between the wire ends and the attachment surfaces, further means, namely a connecting means and a wire severing means are required in addition to the winding head. During the production of such a coil arrangement, it is possible to proceed such that a wire end is initially connected to an attachment surface by means of the connecting means, the actual coil winding is then formed round the winding carrier by means of the winding head and the travelling wire end of the winding wire is finally connected to a further attachment surface by the connecting means and is severed by the wire severing means. An arrangement of this type for carrying out the method outlined hereinbefore described is described in PCT-Application PCT/DE92/00928 belonging to the applicant.

The plurality of means participating in the production of such a coil arrangement results in a complex construction with the known device, correspondingly high production times resulting, in particular, from the paths to be covered by the winding head between the individual, locally fixedly installed production stations (connecting station, severing station).

The object of the present invention is to provide a generic device and a method which allow a construction which is as compact as possible and a reduction of the production times.

SUMMARY OF THE INVENTION

In the device according to the invention, the wire guiding means, the connecting means and the wire severing means are integral means of the winding head. A device of this type in effect provides a highly integrated winding head which, in addition to the actual wire guiding function, during the winding of a wire conductor onto a winding carrier, simultaneously performs the functions of connecting the wire ends to the winding carrier or another separate attachment surface carrier and the subsequent wire severing function. Owing to the combination in a constructional unit, the entire device forms a compact arrangement so the connection of the wire conductor to the attachment surface and the severing of the wire conductor can take place in one and the same relative position with respect to the attachment surface of the attachment surface carrier. Intermediate paths which are produced since the wire guiding means has to be guided from a connecting means to a severing means in devices according to the prior art are therefore unnecessary when producing the connection.

Although the device according to the invention, as mentioned above, is particularly suitable for the production of coil arrangements, that is for carrying out a winding process and for producing connections, the device according to the invention can similarly be used to advantage quite generally wherever connections are to be produced at specific points between a wire conductor and an attachment surface and the wire conductor (by the winding/connecting device according to the invention, described herein as "winding head") is to be guided in the intermediate region over a predetermined path of movement from one connecting point to another connecting point. It is not necessary to perform a winding process in each case but a substantially meandering course in a plane or any other desired wire course between two connecting points can be produced with appropriate axial control of the winding/connecting device.

In a preferred embodiment of the device according to the invention, the wire guiding means, the connecting means and the wire severing means are combined in a tool head, the actuating or adjusting members required for the individual means being arranged outside the tool head. This construction represents miniaturization which allows the device according to the invention also to be used with the smallest attachment surfaces such as the standard attachment surfaces of a chip measuring only 100 micrometres×100 micrometres.

The wire guiding means is preferably provided with a wire deflecting means which allows a wire conductor supplied substantially parallel to the connecting means to be deflected in order to save space transversely to the adjustment axis of the connecting means so the wire conductor comes to rest between the connecting means and the attachment surface when producing the connection.

It is mentioned at this point that the connecting means is not restricted to a specific type but rather can be selected at random from the number of connecting means available such as a thermode, a thermosonic connecting means, a laser welding means, etc. or even a combination thereof.

When using a laser welding means, a means of the type described in DE-OS 42 00 492 in which the laser power emitted by a laser source is conveyed by means of a glassfibre conductor directly to the connecting point has proven particularly advantageous. Use of such a laser welding means together with the device according to the invention affords the particular advantage that the winding head does not have to be loaded by the apparatus forming the laser source which can be arranged stationarily remotely from the winding head. The glassfibre conductor can then be integrated into the winding head as a connecting means. This allows a powerful laser welding means to be used in the device according to the invention without disadvantageously increasing its size by the above-mentioned means.

It is also possible to combine the wire guiding means, the connecting means and the wire severing means overall or in part to form a functional unit. For example, the wire guiding means can be combined with the connecting means in that, for example in the case of a thermosonic bonding head as connecting means, the wire is supplied through a capillary in the bonding head. It is also possible, if necessary, additionally to integrate the severing means in a functional unit composed of wire guiding means, connecting means and wire severing means. An example of this would be a thermosonic bonding head which is provided with a wire guiding capillary and also has a severing edge formed in the wire contact region. A maximum of integration can be achieved in this way.

The wire, deflecting means is preferably formed by an aspirator acting transversely to the adjustment axis of the wire guiding means. In this advantageous design of the wire deflecting means, the production thereof merely requires a vacuum connection in the region of the connecting means which causes the wire conductor supplied substantially parallel to the adjustment axis of the connecting means by the wire guiding means to be deflected transversely to the adjustment axis of the connecting means owing to the suction, so the connecting means can act upon the wire conductor, for example by thermal or pressure loading in the case of a thermode.

A further possibility involves providing a gripper means pivotal transversely to the adjustment axis of the connecting means for the wire deflecting means.

In one possible embodiment of a wire deflecting means which is similar in principle but is preferred with respect to the compactness achievable, the wire guiding means itself is designed to pivot transversely to the adjustment axis of the connecting means in order then to produce, in co-operation with the attachment surface of the attachment surface carrier which the wire conductor strikes, such a deflection of the wire conductor that the wire conductor comes to rest between the connecting means and the attachment surface.

It has proven particularly advantageous if the device according to the invention is constructed in such a way that the actuating or adjusting members allocated to the individual means are arranged in a tool head carrier which can be coupled to the tool head. This allows a simple exchange of tool head to be carried out if necessary to enable combinations of tool head means to be adapted to one another in a particular manner. For example, it may also prove advantageous, depending on the combination of materials of wire conductor and attachment surface, to use a connecting means of a specific type. Thus, the thermal compression method has proven advantageous, for example, for a connection on an attachment surface of a captone film and the thermosonic method with a chip attachment surface, and a combination of these methods is also conceivable. However, one and the same actuating or adjusting member can invariably be used independently of the choice of connecting means. In addition to simple and rapid tool head exchange, this has a desirable effect on the tool production costs.

The actuating or adjusting members can be designed in various ways. For example, they can be designed as compressed air actuating members such as piston/cylinder units or as solenoid-type actuating members.

Furthermore, it is advantageous to provide a further wire guiding means in addition to the above-described wire guiding means. This allows an additional material such as gold or a gold alloy to be supplied as bonding wire, if necessary, for example if the materials of wire conductor and attachment surface cannot form a compatible joint, to guarantee a reliable, electrically conductive connection between the wire conductor and the attachment surface consisting, for example, of an aluminium surface.

This further wire guiding means can be integrated into the connecting means.

A further advantageous method of producing or increasing the compatibility of the connection between the wire conductor material and the attachment surface material involves providing a protective gas supply means in the region of the connecting means.

According to a further variation, a vacuum means is provided in the region of the connecting means, for example in that the entire tool head is surrounded by a vacuum bell.

The protective gas supply means can also be allocated a coating means which allows the application of a protective layer to the connecting point, for example the application of a passivating layer as corrosion protection, preferably during the loading of the connecting point with protective gas.

To monitor and/or control the device according to the invention, the device can be provided, in a particular embodiment, with a camera, in particular a CCD camera equipped with CCD (charge coupled device) image sensors, which can be arranged on the tool head itself or also on the tool head carrier. The camera can also be integrated into the tool head or the tool head carrier depending on method of mounting.

The method according to the invention permitted by the use of the device according to the invention is also disclosed.

According to the invention, the device is used to connect a bondable wire conductor directly to the unbumped attachment surfaces of an electronic component such as a chip. The wire is connected, for example, directly to the aluminium pads without bumps previously having been applied thereto. This results in a considerable simplification in the electrical attachment of chips or in components which are comparable with regard to the method of attachment.

It has proven advantageous if a bondable winding wire, preferably a copper bonding wire is used as wire conductor. This allows the device according to the invention firstly to be used for the winding of coils and a direct connection to an unbumped attachment surface then to be produced with one and the same wire.

It has proven particularly advantageous if the connection between the wire and attachment surface is made in a protective gas atmosphere or under vacuum in order to increase the quality of the connection.

Preferred embodiments of the device according to the invention will be described hereinafter with reference to the drawings with an explanation of the method according to the invention by way of example.

DESCRIPTION OF THE PREFERRED EMBODIMENT

Figure 1:
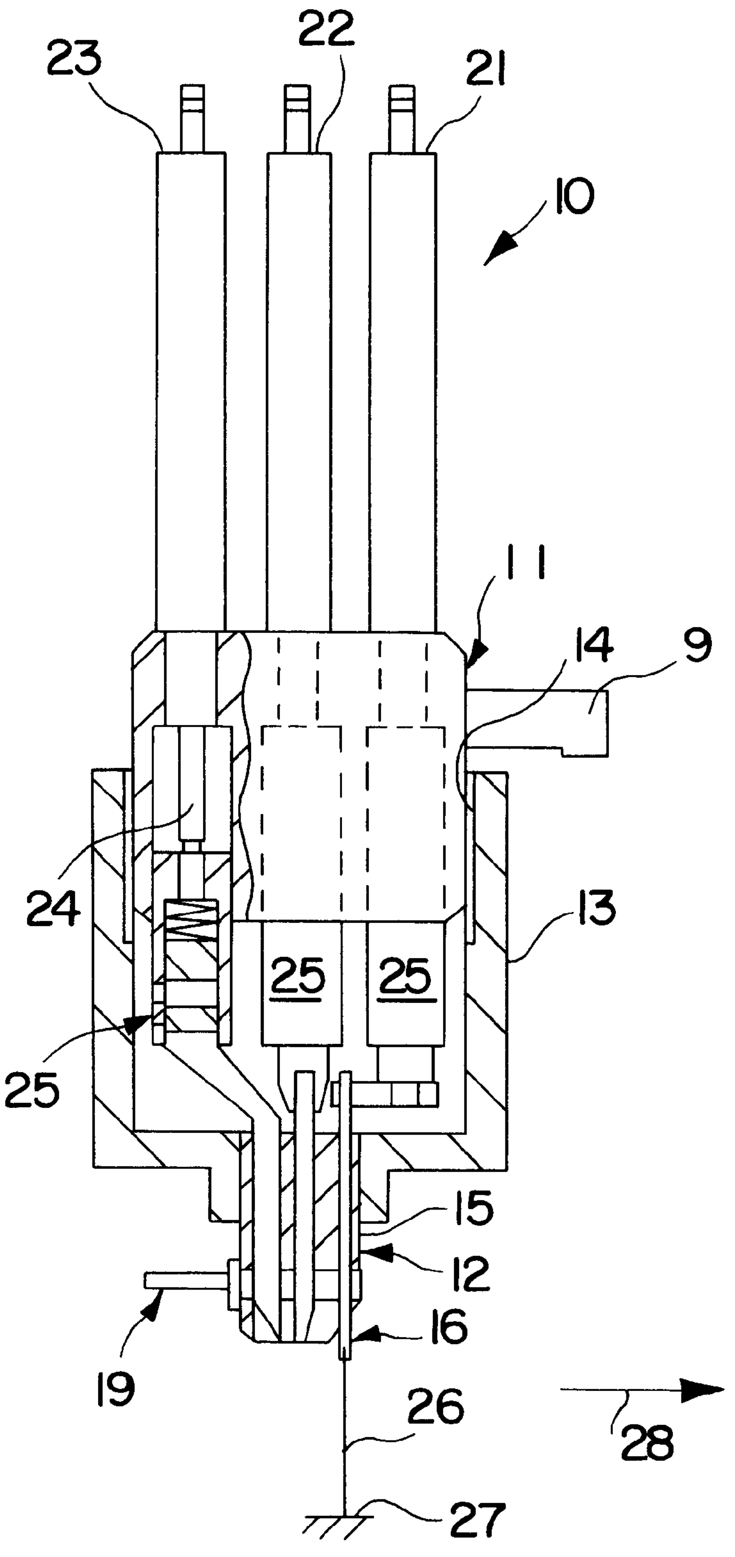
FIG. 1 shows the device according to the invention in a first embodiment with a tool head coupled to a tool head carrier.

FIG. 1 shows, in a first embodiment, a winding/connecting device 10 with a tool head carrier 11 and a tool head 12. The tool head 12 is detachably connected via a connecting element designed as a connecting sleeve 13 here to the tool head carrier 11. For the detachable connection the connecting sleeve 13 has, in its end region facing the tool head carrier 11, an internal thread 14 which co-operates with an external thread of the tool head carrier 11 not shown in detail.

A camera, such as a CCD camera 9, can be arranged on the tool head carrier 11, as shown in FIG. 1, or on the tool head 12 for monitoring operation of the device 10.

The tool head 12 has a tool receiver 15 with tool means received and guided therein, namely a wire guiding means 16, a connecting means 17, a wire severing means 18 and a wire deflecting means 19.

To permit an adjustment movement of the wire guiding means 16, the connecting means 17 and the wire severing means 18 in the direction of an adjustment axis 20, the aforementioned means are provided, at their upper end in FIG. 1, with pneumatic piston/cylinder units 21, 22, 23 provided as adjusting members. Damping means 25 can be provided between piston rods 24 of the piston/cylinder units 21, 22, 23 and the ends of the means 16, 17, 18, as shown by way of example for the wire severing means 18.

In this case, the means 16, 17, 18 are coupled not directly to the piston/cylinder units 21, 22, 23 but via the damping means 25.

The function of the winding/connecting device 10 is described in detail hereinafter.

FIG. 1 shows the winding/connecting device 10 in a winding configuration in which the wire guiding means 16 is located in a position advanced from the tool receiver 15. A winding wire 26 or generally a wire with which, for example, a wire connection is to be produced between two attachment surfaces is guided through the wire guiding means 16 of tubular design. In this configuration, the winding/connecting device 10 can be used in the conventional manner as a winding head which is movable round one or more axes in space or generally as a wire guiding head.

In order to connect the wire 26 to an attachment surface not shown in detail in FIG. 1 following a winding process or to a free wire end 27 fixed in a different manner using the winding/connecting device 10 shown in FIG. 1, the tool head 12 is initially moved in the direction of the arrow 28 and the wire guiding means 16 driven into the tool head 12 by actuation of the piston/cylinder unit 21. The wire 26 is thus placed on the underside of the tool head so the connecting means 17 can be driven out of the tool head 12 until it rests on the attachment surface with interposition of the wire 26. Depending on the distance between the tool head 12 and the attachment surface, the winding/connecting device 10 can be advanced overall in the direction of the adjustment axis 20.

Depending on the type of connecting means 17, the connecting means operates, for example, with thermal compression or ultrasonic exitation with or without simultaneous heating of the attachment surface, the wire 26 being connected to the attachment surface. After the connection has been made, the severing means 18, which has the form of a severing blade in the embodiment shown in FIG. 1, is driven out in order to sever the wire 26 close to the connecting point.

Figure 2:
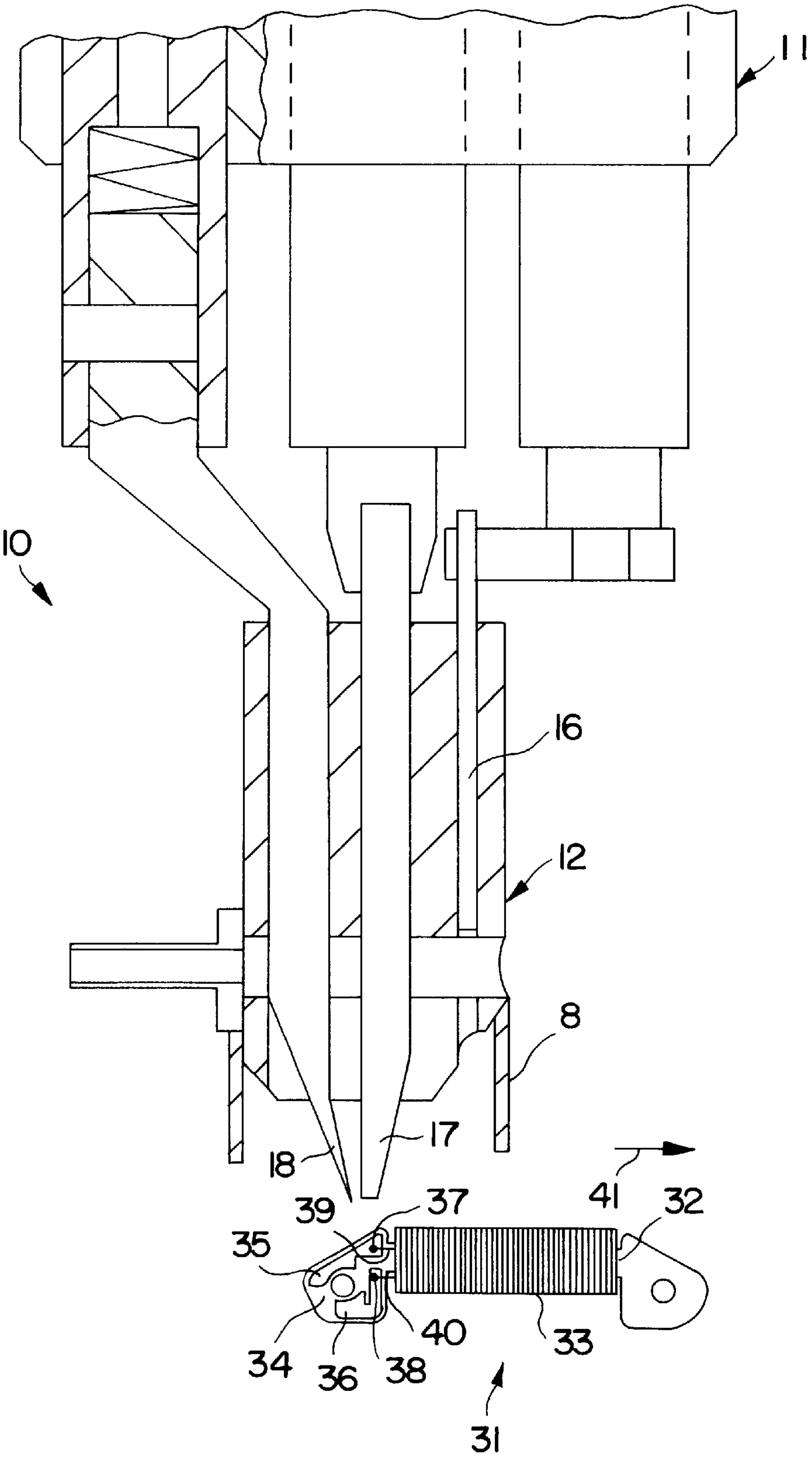
FIG. 2 shows the device in an enlarged partial view after the winding of a coil and the connection of winding wire ends to attachment surfaces of a coil carrier.

This configuration of the winding/connecting device 10 is shown in FIG. 2. The wire guiding means 16 is located in the retracted position and the connecting means 17 and the wire severing means 18 in the advanced position.

A vacuum bell 8 is also shown surrounding the tool head 12. The vacuum bell 8 acts as a vacuum means for producing a vacuum in the connecting region as described in more detail below.

Figure 3A:
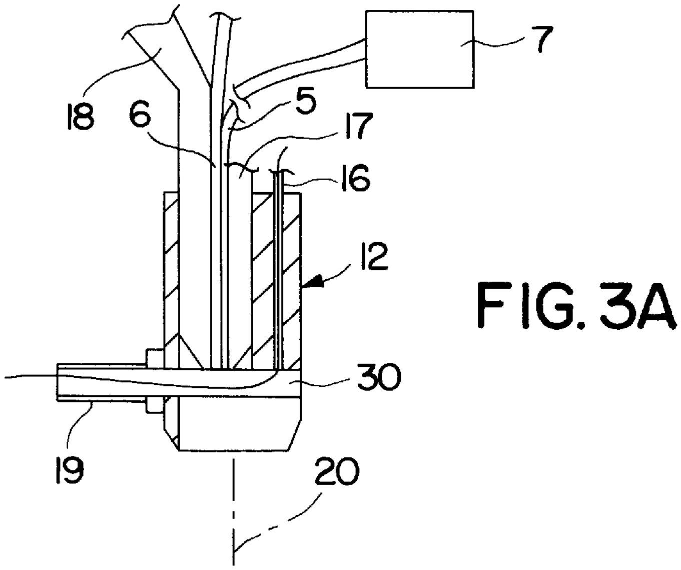
FIGS. 3A to 3C show the tool head carrier in various configurations, succeeding one another in time, for forming a wire conductor connection.

The configuration of the winding/connecting device 10 will be described hereinafter with reference to FIGS. 3A to 3C, when producing a wire connection, for example for fixing the wire end on an attachment surface before carrying out a subsequent winding process or for a wire connection between attachment surfaces. In FIG. 3A, in contrast to the illustration in FIG. 1, the wire guiding means 16, the connecting means 17 and the wire severing means 18 are initially located in a completely retracted position and clear a duct 30 extending transversely to the adjustment axis 20.

The wire conductor, 26 supplied through the wire guiding means 16 is brought by the wire deflecting means 19 designed as an aspirator here with its free wire end in a position transversely to the adjustment axis 20 and the remaining advance of the wire by the wire guiding means can be prevented by means of a clamping means. A means to thread the wire into the wire guiding means assisted by air jet streams can be provided in addition to the clamping means.

Figure 3B:
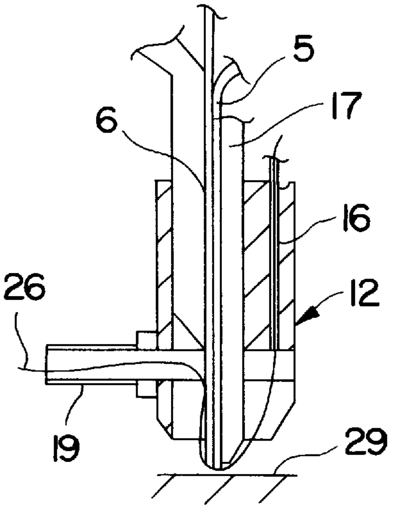

The connecting means 17 is then driven out as illustrated in FIG. 3B, until it rests on an attachment surface 29 with interposition of the wire 26. In this position, the wire 26 is now connected to the attachment surface 29.

As discussed above, a laser welding means can be included with the connecting means 17. The laser welding means comprises a laser source 7 for providing laser power, which is conveyed to the connecting point via a glassfibre conductor 5. A protective gas supply means 6 can also be included in the region of the connecting means 17 for increasing the compatibility of the connection between the wire 26 and attachment surface as described above.

Figure 3C:
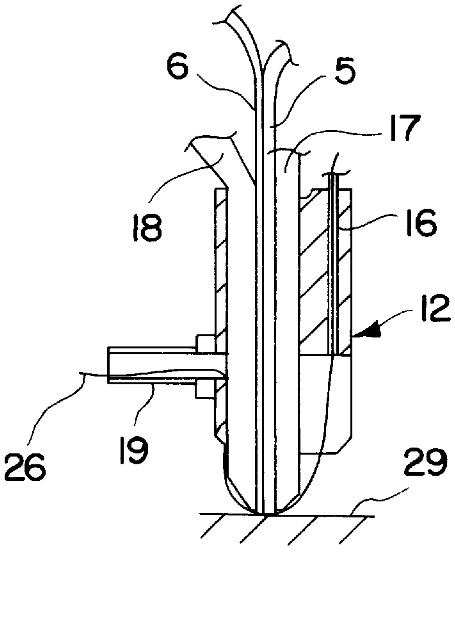

As illustrated in FIG. 3C, the wire severing means 18 is then also driven out so the wire 26 can be severed by the severing means 18 close to the connecting point. The severed wire end is then aspirated by the suction means 19.

FIG. 2 shows an example of a possible application of the winding/connecting device 10 according to the invention in the production of a clock coil 31 which is used in electrically operated clocks and has a winding carrier 32 with a coil winding 33 arranged thereon. The attachment surfaces of the clock coil 31 are formed by a so-called "captone film" 34 which consists of a plastic film with metal plating 35, 36 arranged thereon. FIG. 2 shows two connecting points 37, 38 An the metal plating 35, 36, to which winding wire ends 39, 40 are connected to the metal plating 35, 36.

The clock coil 31 shown in FIG. 2 can be produced using the winding/connecting device 10 according to the invention in that a first connection between the winding wire 26 and the first metal plating 35 is initially produced to form the connecting point 37 as shown in FIGS. 3A, 3B, 3C. The coil winding 33 is then produced by superimposing a rotational movement of the winding carrier 32 round its longitudinal axis and a translational movement of the tool head 12 in the direction of the arrow 41 and back. As already described hereinbefore, the second wire connection is finally made at the connecting point 38 and the wire 26 severed.

Figure 4:
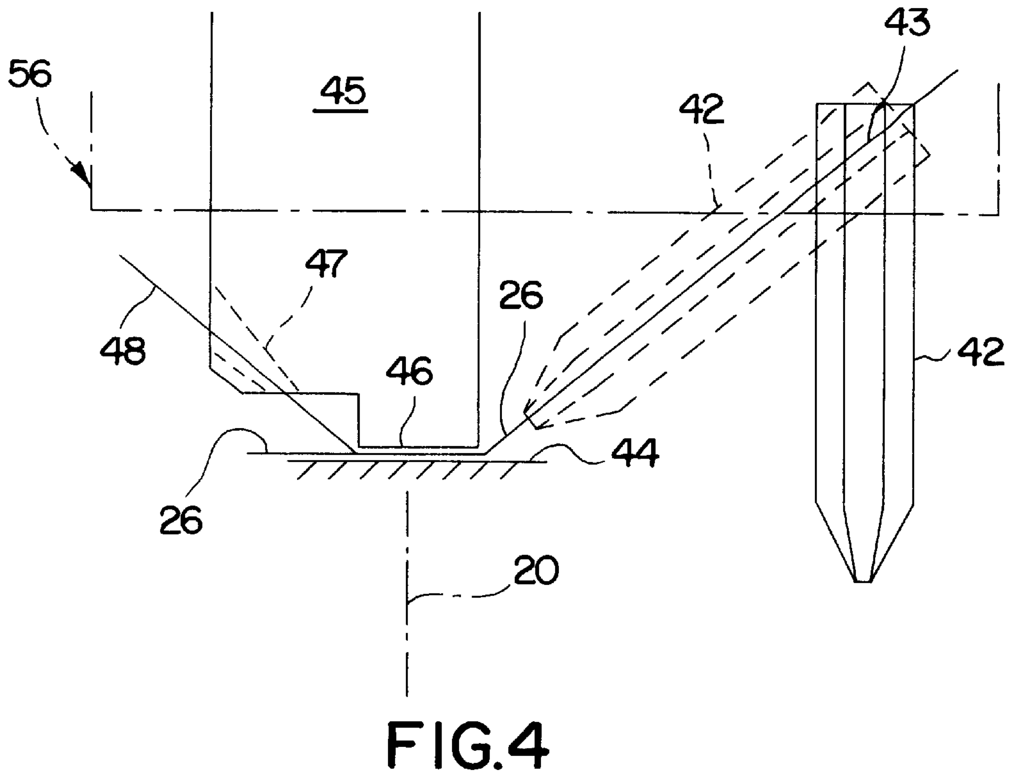
FIG. 4 is a schematic illustration of the tool head in a first variation of the tool head shown in FIG. 1.
Figure 5:
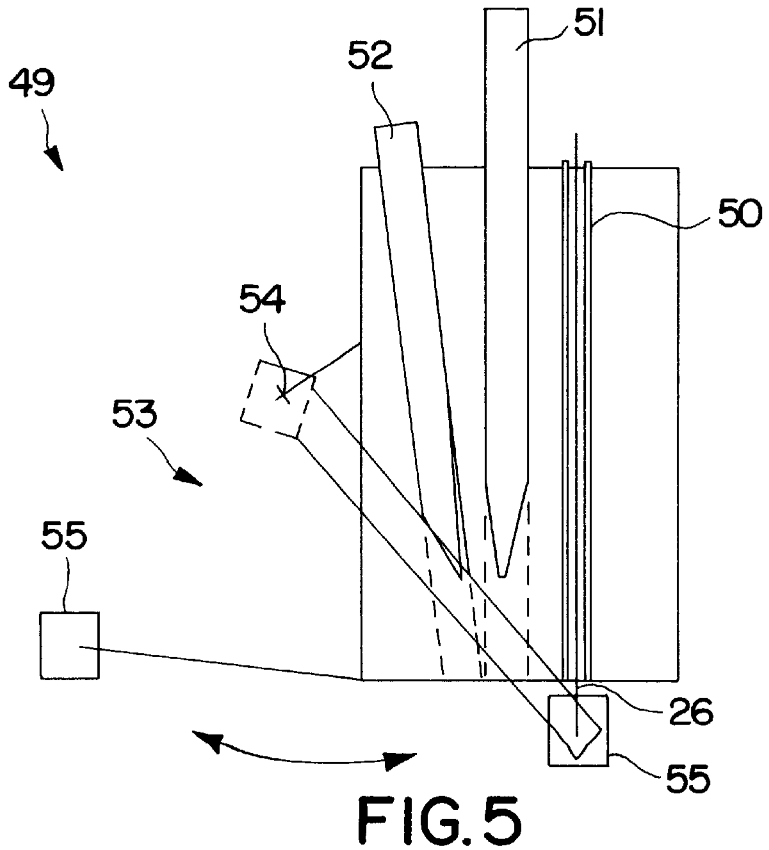
FIG. 5 is a schematic illustration of the tool head in a further variation of the tool head illustrated in FIG. 1.

FIGS. 4 and 5 show variations of tool heads in schematic illustrations.

FIG. 4 shows a tool head 56 with a wire guiding means 42 which is pivotal round a pivot 43 transversely to the adjustment axis 20 of the tool head. FIG. 4 shows the wire guiding means 42 in its winding position orientated substantially parallel to the adjustment axis 20 and in the pivoted state. Owing to the pivotability of the wire guiding means 42, it is possible to dispense with a separate deflecting means. Rather, in the embodiment shown in FIG. 4, the winding wire 26 is conveyed through a wire advance with pivoted wire guiding means 42 onto an attachment surface 44 and is deflected thereon.

In this position, a connecting means 45 which is adjustable in the direction of the adjustment axis can be driven toward the attachment surface 44, the wire 26 coming to rest between the attachment surface 44 and a contact surface 46 of the connecting means 45.

In the embodiment shown in FIG. 4, the connecting means 45 is designed in such a way that a further wire guiding means 47, for example in the form of a duct, is formed in it in order to guide an additional wire 48 onto the attachment surface 44 so the wire 26 can be connected to the attachment surface 44 simultaneously with the connection of the additional wire 48 to the attachment surface 44. This additional wire 48 can be made up so as to allow the connection of materials of wire 26 and attachment surface 44 which are poorly connectable to one another or are incompatible. It is also possible to adapt the material of the additional wire 48 to the materials to be connected so as to provide special corrosion protection or insulation relative to the exterior. The wire severing means has not been shown in FIG. 4.

FIG. 5 shows a further variation of a schematically illustrated tool head 49 which, similarly to the tool head 12 shown in FIG. 1, has a wire guiding means 50, a connecting means 51 and a wire severing means 52. In contrast to the embodiment shown in FIG. 1, the tool head 49 has a deflecting means 53 consisting of a gripping means which is pivotal round a pivot point 54 belonging to the tool head 49. In order to bring the wire 26 which has been moved downwardly from the wire guiding means 50 into a connecting position in which the wire comes to rest between the connecting means 51 and an attachment surface not shown in detail in FIG. 5, the wire 26 is taken up by a gripper 55 of the deflecting means 53 and the held wire 26 is pivoted with the gripper round the pivot point 54 into its left-hand position shown in FIG. 5. Starting from this wire position the wire 26 can be connected to an attachment surface and the wire 26 can then be severed as described hereinbefore in conjunction with FIGS. 3B and 3C.

I claim:

1. A device for producing a coil winding from coil wire on a winding carrier, the device comprising:

a winding head movable relative to the winding carrier;

wire guiding and supply means for guiding the wire through the winding head to an attachment surface of a substrate, wherein the device is movable along an adjustment axis substantially perpendicular to the attachment surface and the wire guiding and supply means guides the wire through the winding head substantially parallel to the adjustment axis;

wire connecting means for producing an electrically conductive connection between the wire and the attachment surface;

wire severing means for severing the winding wire after the wire has been connected to the attachment surface; and deflecting means comprising a duct extending through the winding head for deflecting the wire in a direction transverse to the adjustment axis so that the wire is positioned inside the winding head between the connecting means and the attachment surface;

wherein the wire guiding and supply means, the wire connecting means, the defecting means and the wire severing means are all provided as integral components of the winding head.

2. A device according to claim 1 further comprising:

at least one adjusting member for actuating or adjusting the wire connecting means, the wire guiding and supply means and the wire severing means along the adjustment axis;

wherein the winding head further comprises a tool head; and wherein the wire guiding and supply means, the wire connecting means and the wire severing means are combined in the tool head, and the at least one adjusting member is arranged outside the tool head.

3. A device according to claim 2 wherein the at least one adjusting member is arranged in a tool head carrier which can be coupled to the tool head.

4. A device according to claim 2 wherein the at least one adjusting member is a compressed air actuating member.

5. A device according to claim 2 wherein the at least one adjusting member is a solenoid-type actuating member.

6. A device according to claims 1 further comprising a laser source, and wherein the wire connecting means is a glassfibre conductor which is integrated into the winding head and is connected to the laser source, the laser source being arranged independently of the winding head.

7. A device according to claim 1 wherein said attachment surface is an unbumped surface of an electronic component.

8. A device according to claim 1 wherein said coil wire comprises copper bonding wire.

9. A device according to claim 1 wherein the wire deflecting means is formed from an aspirator acting transverse to the adjustment axis.

10. A device according to claim 1 wherein the wire guiding and supply means is pivotal transversely to the adjustment axis.

11. A device according to claim 1 wherein the wire guiding and supply means is integrated into the wire connecting means.

12. A device according to claim 1 further comprising a protective gas supply means for supplying protective gas to the wire connecting means.

13. A device according to claim 12 wherein said electrically conductive connection is made in a protective gas atmosphere provided by the protective gas supply means.

14. A device according to claim 1 further comprising a vacuum system in a region near the wire connecting means for producing a vacuum in the region near the wire connecting means.

15. A device according to claim 14 wherein said electrically conductive connection is made in said vacuum.

16. A device according to claim 1 further comprising a CCD monitoring camera on the tool head.

17. A device according to claim 1 further comprising a CCD monitoring camera on the winding carrier.

* * * * *